United States Patent
Yu et al.

(10) Patent No.: US 11,845,840 B2
(45) Date of Patent: Dec. 19, 2023

(54) POLYPHENOL-MODIFIED HYDROCARBON COMPOSITION-BASED PREPREG AND COPPER CLAD LAMINATE PREPARED THEREFROM

(71) Applicant: CHANGZHOU ZHONGYING SCIENCE & TECHNOLOGY CO., LTD., Changzhou (CN)

(72) Inventors: Weizhong Yu, Changzhou (CN); Shuchun Gu, Changzhou (CN); Cheng Yu, Changzhou (CN); Kai Feng, Changzhou (CN)

(73) Assignee: CHANGZHOU ZHONGYING SCIENCE & TECHNOLOGY CO., LTD., Changzhou (CN)

( * ) Notice: Subject to any disclaimer, the term of this patent is extended or adjusted under 35 U.S.C. 154(b) by 237 days.

(21) Appl. No.: 17/424,937

(22) PCT Filed: Jan. 21, 2020

(86) PCT No.: PCT/CN2020/073412
§ 371 (c)(1),
(2) Date: Jul. 22, 2021

(87) PCT Pub. No.: WO2020/156366
PCT Pub. Date: Aug. 6, 2020

(65) Prior Publication Data
US 2022/0106452 A1    Apr. 7, 2022

(30) Foreign Application Priority Data
Jan. 30, 2019 (CN) .......................... 201910090260.5

(51) Int. Cl.
| | | |
|---|---|---|
| *B32B 15/14* | (2006.01) | |
| *C08J 5/24* | (2006.01) | |
| *B32B 5/02* | (2006.01) | |
| *B32B 15/20* | (2006.01) | |
| *B32B 37/10* | (2006.01) | |

(52) U.S. Cl.
CPC .............. *C08J 5/244* (2021.05); *B32B 5/024* (2013.01); *B32B 15/14* (2013.01); *B32B 15/20* (2013.01); *B32B 37/10* (2013.01); *B32B 2260/021* (2013.01); *B32B 2260/046* (2013.01); *B32B 2262/101* (2013.01); *C08J 2371/12* (2013.01); *C08J 2427/18* (2013.01)

(58) Field of Classification Search
CPC .... C08J 2427/18; C08J 2371/12; C08J 5/244; B32B 2262/101; B32B 2260/046; B32B 2260/021; B32B 37/10; B32B 15/20; B32B 15/14; B32B 5/024
See application file for complete search history.

(56) References Cited

FOREIGN PATENT DOCUMENTS

| | | | |
|---|---|---|---|
| CN | 1223727 | A | 7/1999 |
| CN | 101643525 | A | 2/2010 |
| CN | 101643571 | A | 2/2010 |
| CN | 102093666 | A | 6/2011 |
| CN | 1069164 | A | 7/2017 |
| CN | 109796728 | A | 5/2019 |
| EP | 2657296 | A1 * | 10/2013 ............ B32B 15/08 |
| JP | 200163953 | A | 6/2001 |
| WO | 2014071453 | A1 | 5/2014 |

OTHER PUBLICATIONS

Preparation of Dental Restoration Composites with Improved Interfacial Adhesion Basing on Mussel-Inspired Surface Modification and PMMA Coating, Engineering Science and Technology I, Chinese Masters Theses Full-Text Database. No. 2, Feb. 15, 2016), p. 25, section 2.3.1.1 to p. 44, section 3.2.3.
Preparation of Highly Conductive Composites through Polyphenol Surface Modification of Micro-Nanoparticles, Science-Engineering (A), China Doctor's Theses Full-Text Database, No. 1, Jan. 15, 2019.
PCT Written Opinion of the International Searching Authority for corresponding PCT International Application No. PCT/CN2020/073412.
PCT International Search Report of the International Searching Authority for corresponding PCT International Application No. PCT/CN2020/073412.

* cited by examiner

*Primary Examiner* — Vishal I Patel
(74) *Attorney, Agent, or Firm* — Olive Law Group, PLLC

(57) ABSTRACT

The present disclosure relates to a polyphenol-modified hydrocarbon composition-based prepreg and a copper clad laminate prepared therefrom. The present disclosure uses polyarylether or polyolefin resin modified with hydroxyl end, amino end or mercapto end as the matrix resin and epoxy resin as the main curing agent to construct a hydrocarbon composition with excellent dielectric properties.

8 Claims, No Drawings

POLYPHENOL-MODIFIED HYDROCARBON COMPOSITION-BASED PREPREG AND COPPER CLAD LAMINATE PREPARED THEREFROM

CROSS REFERENCE TO RELATED APPLICATIONS

This is a national phase application of PCT Application No. PCT/CN2020/073412, filed Jan. 21, 2020, which claims priority to Chinese Patent Application No. 2019100902605, filed Jan. 30, 2019, the contents of which are incorporated herein by reference in their entireties.

TECHNICAL FIELD

The present disclosure belongs to the field of communication materials, and specifically relates to a polyphenol-modified hydrocarbon composition-based prepreg and a copper-clad laminate prepared therefrom.

BACKGROUND

Copper clad laminate is one of the key materials in the information and electronics industry, and it has been widely used in many fields such as communication base stations, satellites, driverless cars, drones and intelligent robots. Polyphenylene ether and polyolefin resins can be used to prepare copper clad laminates because of their excellent dielectric properties. Nowadays, people have developed polyphenylene ether-based and polydiene-based thermosetting copper clad laminates. Among them, thermosetting polyphenylene ether resins are mainly divided into two categories: pendant vinyl modification and terminal vinyl modification. The preparation process of pendant vinyl modified polyphenylene ether needs to use butyl lithium and other highly reactive, dangerous, and toxic substances, and the production process is extremely complicated. The vinyl-terminated polyphenylene ether has been commercialized, but its curing process requires the addition of an additional crosslinking agent. For example, CN1745142A and WO2006/023371A1 use TAIC and unsaturated olefin monomers as small molecular crosslinking curing agents for thermosetting polyphenylene ether. However, such small molecular crosslinking curing agents during the production process of sizing and prepreg baking are very volatile, which causes the curing degree of the polyphenylene ether and the quality of the prepreg to be difficult to control, and the pollution is serious. To solve this problem, CN102807658B and CN103467967A use polymer crosslinking curing agents such as polydiene. However, except for polystyrene, polyphenylene ether generally has poor compatibility with other resins, resulting in serious phase separation of the resin in the composite matrix of the prepreg.

In addition, glass fiber cloth and inorganic fillers (such as silica, alumina, etc.) commonly used in the production of copper clad laminates have abundant hydrophilic functional groups—hydroxyl groups on the surface, while vinyl-modified polyphenylene ether groups and polydienes do not contain oxygen-containing, nitrogen-containing and other hydrophilic functional groups, and has poor compatibility with glass fiber cloth and inorganic fillers. The dielectric properties and uniformity of different parts of the copper clad laminate prepared therefrom are imperfect, which is not suitable for the production of multilayer copper clad laminates, and is also difficult to meet the current high-frequency and high-speed communication requirements for the diversification and complexity of the functions and high-density wiring layouts of the copper clad laminate materials.

Coupling agent for surface modification of inorganic filler, glass fiber cloth or copper foil is a commonly used method to enhance the interaction between them and the matrix resin. "Advanced Functional Materials" (2007, 318, 426.) reported that some plant polyphenols can be oxidized and polymerized on the surface of almost all substances quickly and strongly adsorbed under ultraviolet light. At the same time, polyphenols are rich in hydroxyl functional groups, which can participate in the curing process of epoxy resins. Therefore, polyphenol is a potential material that can effectively improve the interaction and adhesion between the materials in the copper clad laminate matrix.

SUMMARY

Technical Solutions

The present disclosure is intended to provide a polyphenol-modified hydrocarbon composition-based prepreg.

The present disclosure is also intended to provide a high-frequency and high-speed copper clad laminate prepared from the prepreg with excellent thermal-mechanical properties, good dielectric properties and uniformity, and high copper foil peeling strength.

The technical solution adopted by the present disclosure to solve the above-mentioned problems is a polyphenol-modified hydrocarbon composition-based prepreg, which is prepared in sequence through the following steps:

S1, soaking a reinforced material with 0.1~80 mg/mL polyphenol aqueous solution, air-drying in a non-inert atmosphere and under ultraviolet light for 5~360 min such that a product is obtained by drying, namely, the reinforced material with polyphenol on a surface denoted as reinforced material@polyphenol;

S2, adding 0.1~25 wt/v % filler to 0.1~80 mg/mL polyphenol aqueous solution, stirring to dispense evenly in the non-inert atmosphere and under irradiating by ultraviolet light; and then performing filtering, washing, and drying after soaking for 5~720 min, such that a product is obtained, namely, the filler with polyphenol on a surface is denoted as filler@polyphenol;

S3, preparing a uniform dispersion of a hydrocarbon composition with a solid content of 35~75 wt/v %, and soaking the reinforced material@polyphenol in the uniform dispersion, and baking and drying to obtain the prepreg, the polyphenol is a mixture of one or more of plant polyphenols with catechol or pyrogallol structure in a molecular formula, a pH value of the polyphenol aqueous solution is between 4.5 and 9.0, and the non-inert atmosphere is an atmosphere containing oxygen, where a content of oxygen in the non-inert atmosphere is ≥3 v/v %, a wavelength of the ultraviolet light is ≤340 nm, an intensity of the ultraviolet light is ≥1 mW/cm2, and a ambient temperature during ultraviolet light irradiation is ≤50° C., a distance between an ultraviolet light source and an irradiated object is ≤100 cm; the hydrocarbon composition comprises six types components such as end-group-modified hydrocarbon polymer, primary curing agent, secondary curing agent, curing accelerator, polyphenol @ filler and flame retardants.

In a preferred embodiment: in step S1, the reinforced material is selected from a group consisting of 106, 1080, 2116 and 7628 electronic grade alkali-free glass fiber, and fluorine resin fiber woven cloth, the polyphenol in the reinforced material@polyphenol accounts for 0.03~1.0 wt % of a mass of the reinforced material.

In a preferred embodiment: in step S2, the filler composed of an inorganic filler and an organic filler, wherein the inorganic filler is a mixture of one or more selected from a group consisting of $SiO_2$, $Al_2O_3$, $TiO_2$, $ZnO$, $MgO$, $Bi_2O_3$, $AlN$, $BN$, $SiC$, $Si_3N_4$, $Al(OH)_3$, $Mg(OH)_2$, $SrTiO_3$, $BaTiO_3$, $Mg_2TiO_4$, $Bi_2(TiO_3)_3$, $PbTiO_3$, $NiTiO_3$, $CaTiO_3$, $ZnTiO_3$, $Zn_2TiO_4$, $BaSnO_3$, $Bi_2(SnO_3)_3$, $CaSnO_3$, $PbSnO_3$, $MgSnO_3$, $SrSnO_3$, $BaZrO_3$, $CaZrO_3$, $PbZrO_3$, $MgZrO_3$, $SrZrO_3$, $ZnZrO_3$, graphite oxide, graphite fluoride, talc, mica powder, kaolin, clay, solid glass bead, hollow glass bead, glass fiber, basalt fiber and carbon fiber, the particle size of the inorganic filler is ≤100 μm, and the amount of the inorganic filler is 12~60 wt % of the hydrocarbon composition;

the organic filler is a mixture of one or more selected from a group consisting of ultra-high molecular polyethylene fiber, Kevlar fiber, fluororesin, polyimide and derivatives thereof; a content of the organic filler is 1~20 wt % of the hydrocarbon composition, and the polyphenol in the filler@polyphenol accounts for 0.03~1.0 wt % of a mass of the filler.

In a preferred embodiment: in step S3, the hydrocarbon polymer is a mixture of one or more selected from a group consisting of polyarylether, polyolefin and derivatives thereof, the end group is one or more selected from a group consisting of an amine group, a hydroxyl group and a sulfhydryl group, and the end-group-modified hydrocarbon polymer accounts for 4~25 wt % of the hydrocarbon composition.

In a preferred embodiment: in step S3, the primary curing agent is epoxy resin, specifically a mixture of one or more selected from a group consisting of bisphenol-A epoxy resin, hydrogenated bisphenol-A epoxy resin, bisphenol-S epoxy resin, bisphenol-F epoxy resin, dicyclopentadiene epoxy resin, naphthalene ring structure epoxy resin, biphenyl epoxy resin, heterocyclic epoxy resin, novolac epoxy resin, silicone epoxy resin, multifunctional epoxy resin, aliphatic epoxy resin, cyanate ester modified epoxy resin and derivatives thereof, the primary curing agent accounts for 15~68 wt % of the hydrocarbon composition;

the secondary curing agent is a mixture of one or more selected from a group consisting of active polyester, glycol, polyol, diamine, polyamine, dithiol, polythiol, diphenol, polyphenol, phenolic resin, cyanate ester resin, acid anhydride, dicyandiamide, benzoxazine and derivatives thereof, the secondary curing agent accounts for 0.1-12 wt % of the hydrocarbon composition;

the curing accelerator is a mixture of one or more selected from a group consisting of tertiary amine compounds, imidazole compounds, phosphine compounds, substituted urea compounds, phenol compounds and boron trifluoride amine complexes; the curing accelerator accounts for 0.02~5.0 wt % of the primary curing agent;

the flame retardants is mixture of one or more selected from a group consisting of aluminum magnesium flame retardant, boron zinc flame retardant, molybdenum tin flame retardant, bromine flame retardant, antimony trioxide, phosphorus flame retardant and nitrogen flame retardant and derivatives thereof, the flame retardant accounts for 1-50 wt % of the hydrocarbon composition.

In a preferred embodiment: in step S3, a solvent of the uniform dispersion is a mixture of one or more selected from a group consisting of an organic solvent that can make the hydrocarbon composition evenly dispersed.

In a preferred embodiment: in step S3, the baking and drying is divided into two stages: a baking and drying temperature in a first stage is 30~110° C., and the baking drying temperature in a second stage is 110~180° C.

A copper clad laminate prepared by using a polyphenol-modified hydrocarbon composition-based prepreg, wherein being prepared in sequence by the following steps:

overlapping and laminating the prepreg and a copper foil coated in a surface of the prepreg to obtain the copper clad laminate, where a number of prepregs is ≥1, a number of copper foils is 1 or 2, a lamination temperature is 130~280° C., and a lamination pressure is 80~130 kg/cm², a lamination duration is 5 min~480 min.

Beneficial Effect

The present disclosure uses polyarylether or polyolefin resin modified with an end hydroxyl, an end amino or an end mercapto as the matrix resin, and epoxy resin as the main curing agent to construct a hydrocarbon composition with excellent dielectric properties. At the same time, the present disclosure also modifies polyphenols on the surfaces of reinforced materials and the fillers. Because polyphenols are rich in hydroxyl functional groups, they can participate in the cross-linking and curing reaction of end-group-modified polyarylethers or polyolefins and epoxy resins. In this way, the matrix resin is directly bonded to the surface of the reinforced material and the filler, enhancing their compatibility and adhesion. In the present disclosure, the prepreg prepared by soaking the dispersion liquid of the hydrocarbon composition with the reinforced material and then baking and drying to obtain the prepreg with uniform glue content, good dipping quality, strong resin adhesion, smooth surface, strong toughness and suitable viscosity. Furthermore, the high-frequency copper clad laminate prepared from the prepreg and copper foil has good thermo-mechanical properties, excellent dielectric properties, good overall performance stability, good uniformity, and high copper foil peeling strength.

The inventor also found that the modification amount of polyphenol on the surfaces of the reinforced material and the filler can not be too small, otherwise the interaction force among the reinforced material, the filler and matrix resin will not increase significantly. However, the modification amount of polyphenol can not be too large, otherwise the dielectric loss of the copper clad laminate will increase.

The present disclosure has mild preparation conditions, low production cost. It is easy to product in batch and large-scale, and the product has strong universality, and has a good industrial production basis and broad application prospects.

DESCRIPTION OF EMBODIMENTS

The following examples further describe in detail a hydrocarbon composition-based prepreg modified by polyphenol and a high-frequency copper clad laminate prepared by using the prepreg provided by the present disclosure. However, these examples are only provided for illustration, not for limiting the present disclosure.

Examples 1~5

The 1080 glass fiber cloth may be soaked in a 40 mg/mL polyphenol aqueous solution for 30 minutes and simultaneously irradiated with ultraviolet light. The wavelength of the ultraviolet light is 260 nm, the intensity of the ultraviolet light is 10 mW/cm², the ambient temperature is 30° C., and the distance from the ultraviolet light source to the object to be irradiated is 30 cm, and then the 1080 glass fiber cloth with a surfaced modified with polyphenol may be taken out, which is recorded as "polyphenol @ 1080 glass fiber cloth". The filler may be stirred and immersed in a 40 mg/mL polyphenol aqueous solution for 30 minutes and simultaneously irradiated with ultraviolet light. The wavelength of ultraviolet light was 260 nm, the intensity of ultraviolet light is 10 mW/cm$^2$, and the ambient temperature is 30° C. The distance between the ultraviolet light source and the irradiated objects is 10 cm. After filtering, washing, and drying, a filler with polyphenol modified on the surface may be obtained, which is denoted as "filler@polyphenol". The end-hydroxyl-modified hydrocarbon polymer, the primary curing agent, the secondary curing agent, the curing accelerator, "filler@polyphenol" and flame retardant uniformly may be dispersed in toluene, and the solid content of the dispersion is controlled to 60 wt %, Then "polyphenol @ 1080 glass fiber cloth" may be soaked in the uniform dispersion, and the prepreg can be obtained after baking. The baking and drying temperature in the first stage may be 60~100° C.; the baking and drying temperature in the second stage may be 100~170° C. Eight prepregs may be taken and stacked together, 1 oz copper foils may be attached on both sides, and laminated under vacuum, pressure, and high temperature for several hours to obtain a copper clad laminate. The specific formula is shown in the table below.

|  | Materials | Exp. 1 | Exp. 2 | Exp. 3 | Exp. 4 | Exp. 5 |
|---|---|---|---|---|---|---|
|  | Polyphenol | Poly-tannins | Poly-tannins | Poly-tannic acid | Poly-tannic acid | Poly-tannins |
| Inorganic filler | SiO$_2$ | 55 | 40 | 60 | 22 | 55 |
|  | Al$_2$O$_3$ | 35 | 35 | 40 | 10 | 0 |
|  | BN | 0 | 5 | 0 | 20 | 0 |
| Organic filler | PTFE Pre-sintered material (Shandong Dongyue) | 8 | 20 | 0 | 18 | 35 |
|  | Krasol HLBH-9200 Hydrogenated hydroxyl end polyolefin (Clayville) | 7 | 10 | 15 | 13 | 16 |
| End-modified Hydrocarbon polymer | Krasol (Clayville) |  |  |  |  |  |
|  | Krasol HLBH-9200 Hydrogenated hydroxyl end polyolefin (Clayville) | 0 | 8 | 0 | 15 | 13 |
|  | Sabic SA-90 hydroxyl-terminated modified polyphenylene ether | 23 | 12 | 10 | 0 | 0 |
| Primary curing agent | Bisphenol-A epoxy resin | 115 | 60 | 20 | 95 | 55 |
|  | Brominated bisphenol-A epoxy resin (Dow DER 530A80) | 0 | 47 | 85 | 10 | 50 |
| Secondary curing agent | Dicyandiamide | 7 | 5 | 4 | 5 | 4 |
|  | Novolac resin (Moitu) | 3 | 5 | 6 | 6 | 6 |
| Curing accelerator | 2-phenylimidazole | 0.10 | 0.10 | 0 | 0.10 | 0.05 |
|  | 2-ethyl-4-methylimidazole | 0.20 | 0.20 | 0.30 | 0.20 | 0.25 |
| Flame retardant | Composition of decabromodiphenylethane and antimony oxide (3:1) | 25 | 15 | 0 | 10 | 0 |
|  | Mg(OH)$_2$ (Albemarle, US) | 10 | 0 | 0 | 0 | 20 |
|  | Melamine pyrophosphate | 0 | 20 | 0 | 25 | 10 |

Comparative Example 1

Comparative Example 1 adopted 1080 glass fiber cloth and filler that are not modified by polyphenol, and the other processes are the same as in Example 1.

Comparative Example 2

Comparative Example 2 adopted polyphenol-modified filler instead of polyphenol-modified 1080 glass fiber cloth, and other processes are the same as in Example 1.

Among them, the test performance of prepregs and copper clad laminates are as follows.

| Product | Parameter | Exp. 1 | Exp. 2 | Exp. 3 | Exp. 4 | Exp. 5 | Cmp. Exp. 1 | Cmp. Exp. 2 |
|---|---|---|---|---|---|---|---|---|
| Pre-preg | Surface | Flat | Flat | Flat | Flat | Flat | Flat | Flat |
|  | Toughness | Moderate | Moderate | Moderate | Moderate | Moderate | Moderate | Moderate |
|  | Surface adhesion | Moderate | Moderate | Moderate | Moderate | Moderate | Moderate | Moderate |

-continued

| Product | Parameter | Exp. 1 | Exp. 2 | Exp. 3 | Exp. 4 | Exp. 5 | Cmp. Exp. 1 | Cmp. Exp. 2 |
|---|---|---|---|---|---|---|---|---|
| Copper clad laminate | Dielectric constant | 4.20 | 3.99 | 4.44 | 3.95 | 3.81 | 4.18 | 4.20 |
| | Dielectric loss factor | 0.010 | 0.009 | 0.0010 | 0.009 | 0.009 | 0.012 | 0.0013 |
| | Tg (° C.) | 145 | 144 | 147 | 144 | 146 | 147 | 144 |
| | Minimum breakdown voltage (kV) | >55 | >55 | >55 | >55 | >55 | 45 | 50 |
| | Peel strength (N/mm) | 1.90 | 1.81 | 1.85 | 1.84 | 1.74 | 1.83 | 1.82 |
| | Dip solder resistance (288° C.) | >10 min | >10 min | >10 min | >10 min | >10 min | ~2 min | ~4 min |
| | Water absorption (%) | 0.27 | 0.22 | 0.26 | 0.25 | 0.24 | 0.45 | 0.43 |
| | Combustibility | V0 | V0 | V0 | V0 | V0 | V0 | V0 |
| | Drillability | Good | Good | Good | Good | Good | Fair | Good |

Note:
the above were average values; dielectric properties were measured by IPC TM-650 2.5.5.5 standard at 1 GHz frequency; breakdown voltage were measured by IPC TM-650 2.5.6 standard; peel strength were measured by IPC TM-650 2.4.8 standard.

As shown in Comparative Example 1, if the surface of the fiberglass cloth and the filler are not modified by polyphenol, the matrix resin cannot be directly bonded to the surface of the fiberglass cloth and the filler, and the adhesion among the three is not strong. The copper clad laminate has poor resistance to immersion soldering and drilling. If only polyphenol is applied to the surface of the filler alone, as shown in Comparative Example 2, the bonding force of the components in the copper clad laminate matrix is improved, and its solder dip resistance and drilling resistance are improved, but the degree is not obvious. Only the surfaces of the fiberglass cloth and the filler are modified with polyphenol, as shown in Examples 1 to 5, since polypolyphenols can participate in the crosslinking and curing reaction of end-group modified polyarylethers or polyolefins and epoxy resins, the matrix resin will directly bond to the surface of the fiberglass cloth and fillers, such that the bonding force among the components in the copper clad laminate matrix can further be maximized to promote and improve the solder resistance and drilling performance of the plates. At the same time, due to the improvement of the uniformity of the plates, the reduction of free volume and defects in the matrix resin, the water absorption and dielectric loss of the copper clad laminate also have a certain degree of decline.

The preparation conditions in the present disclosure is mild, the production cost is low, and it is easy for production in batch and large-scale, with a good industrial production basis and broad application prospects.

What is claimed is:

1. A polyphenol-modified hydrocarbon composition-based prepreg, the polyphenol-modified hydrocarbon composition-based prepreg being prepared by the following steps:
   (S1) soaking a reinforced material with 0.1~80 mg/mL polyphenol aqueous solution, air-drying in a non-inert atmosphere and under ultraviolet light for 5~360 min such that a product is obtained by drying, namely, the reinforced material with polyphenol on a surface denoted as reinforced material@polyphenol;
   (S2) adding 0.1~25 wt/v % filler to 0.1~80 mg/mL polyphenol aqueous solution, stirring to dispense evenly in the non-inert atmosphere and under irradiating by ultraviolet light; and
   then performing filtering, washing, and drying after soaking for 5~720 min, such that a product is obtained, namely, the filler with polyphenol on a surface is denoted as filler@polyphenol;
   (S3), preparing a uniform dispersion of a hydrocarbon composition with a solid content of 35~75 wt/v %, and soaking the reinforced material@polyphenol in the uniform dispersion, and baking and drying to obtain the prepreg,
   the polyphenol is a mixture of one or more of plant polyphenols with catechol or pyrogallol structure in a molecular formula, a pH value of the polyphenol aqueous solution is between 4.5 and 9.0, and the non-inert atmosphere is an atmosphere containing oxygen, where a content of oxygen in the non-inert atmosphere is $\geq 3$ v/v %, a wavelength of the ultraviolet light is $\leq 340$ nm, an intensity of the ultraviolet light is $\geq 1$ mW/cm$^1$, and a ambient temperature during ultraviolet light irradiation is $\leq 50°$ C., a distance between an ultraviolet light source and an irradiated object is $\leq 100$ cm; the hydrocarbon composition comprises six types components such as end-group-modified hydrocarbon polymer, primary curing agent, secondary curing agent, curing accelerator, filler@polyphenol and flame retardants.

2. The polyphenol-modified hydrocarbon composition-based prepreg according to claim 1, wherein: in step (S1), the reinforced material is selected from a group consisting of 106, 1080, 2116 and 7628 electronic grade alkali-free glass fiber, and fluorine resin fiber woven cloth, the polyphenol in the reinforced material@polyphenol accounts for 0.03-1.0 wt % of a mass of the reinforced material.

3. The polyphenol-modified hydrocarbon composition-based prepreg according to claim 1, wherein: in step (S2), the filler comprises an organic filler, and the organic filler is a mixture of one or more selected from a group consisting of ultra-high molecular polyethylene fiber, Kevlar fiber, fluororesin, polyimide and derivatives thereof, or a mixture of some thereof; a content of the filler is 1-20 wt % of the hydrocarbon composition, and the polyphenol in the filler@polyphenol accounts for 0.03-1.0 wt % of a mass of the filler.

4. The polyphenol-modified hydrocarbon composition-based prepreg according to claim 1, wherein: in step (S3), the hydrocarbon polymer is a mixture of one or more selected from a group consisting of polyarylether, polyolefin and derivatives thereof, the end group is one or more selected from a group consisting of an amine group, a hydroxyl group and a sulfhydryl group, and the end-groupmodified hydrocarbon polymer accounts for 4-25 wt % of the hydrocarbon composition.

5. The polyphenol-modified hydrocarbon composition-based prepreg according to claim 1, wherein: in step (S3), the primary curing agent is epoxy resin, specifically a mixture of one or more selected from a group consisting of bisphenol-A epoxy resin, hydrogenated bisphenol-A epoxy resin, bisphenol-S epoxy resin, bisphenol-F epoxy resin, dicyclopentadiene epoxy resin, naphthalene ring structure epoxy resin, biphenyl epoxy resin, heterocyclic epoxy resin, novolac epoxy resin, silicone epoxy resin, multifunctional epoxy resin, aliphatic epoxy resin, cyanate ester modified epoxy resin and derivatives thereof, the primary curing agent accounts for 15~68 wt % of the hydrocarbon composition;

the secondary curing agent is a mixture of one or more selected from a group consisting of active polyester, glycol, polyol, diamine, polyamine, dithiol, polythiol, diphenol, polyphenol, phenolic resin, cyanate ester resin, acid anhydride, dicyandiamide, benzoxazine and derivatives thereof, the secondary curing agent accounts for 0.1-12 wt % of the hydrocarbon composition;

the curing accelerator is a mixture of one or more selected from a group consisting of tertiary amine compounds, imidazole compounds, phosphine compounds, substituted urea compounds, phenol compounds and boron trifluoride amine complexes; the curing accelerator accounts for 0.02~5.0 wt % of the primary curing agent;

the flame retardants is mixture of one or more selected from a group consisting of aluminum magnesium flame retardant, boron zinc flame retardant, molybdenum tin flame retardant, bromine flame retardant, antimony trioxide, phosphorus flame retardant and nitrogen flame retardant and derivatives thereof, the flame retardant accounts for 1-50 wt % of the hydrocarbon composition.

6. The polyphenol-modified hydrocarbon composition-based prepreg according to claim 1, wherein: in step (S3), a solvent of the uniform dispersion is a mixture of one or more selected from a group consisting of an organic solvent that can make the hydrocarbon composition evenly dispersed.

7. The polyphenol-modified hydrocarbon composition-based prepreg according to claim 1, wherein: in step (S3), the baking and drying is divided into two stages: a baking and drying temperature in a first stage is 30~110° C., and the baking drying temperature in a second stage is 110~180° C.

8. A copper clad laminate prepared by using the polyphenol-modified hydrocarbon composition-based prepreg according to claim 1, the copper clad laminate being prepared by the following steps:

overlapping and laminating the prepreg and a copper foil coated in a surface of the prepreg to obtain the copper clad laminate, where a number of prepregs is 1, a number of copper foils is 1 or 2, a lamination temperature is 130~280° C., a lamination pressure is 80~130 kg/cm', and a lamination duration is 5 min~-480 min.

* * * * *